United States Patent [19]

Robinton

[11] Patent Number: 4,640,988
[45] Date of Patent: Feb. 3, 1987

[54] TELEPHONE INTERRUPTER

[75] Inventor: Michael A. Robinton, Palo Alto, Calif.

[73] Assignee: Robinton Products, Inc., Sunnyvale, Calif.

[21] Appl. No.: 596,506

[22] Filed: Apr. 3, 1984

[51] Int. Cl.⁴ .................................. H04M 11/00
[52] U.S. Cl. ............................. 379/90; 379/37; 379/379
[58] Field of Search ............. 179/2 C, 2 DP, 2 A, 179/2 AM, 2 R, 5 R, 5 P, 6.13–6.16, 17 B, 30, 38, 81 R, 81 E, 99 E

[56] References Cited

U.S. PATENT DOCUMENTS

| | | | |
|---|---|---|---|
| 3,564,143 | 2/1971 | Stewart, Jr. | 179/2 A |
| 3,941,943 | 3/1976 | Matheny | 179/99 E |
| 4,055,729 | 10/1977 | Vandling | 179/2 C |
| 4,059,727 | 11/1977 | Kingswell et al. | 179/2 AM |
| 4,241,237 | 12/1980 | Paraskevakos et al. | 179/2 AM |
| 4,394,540 | 7/1983 | Willis et al. | 179/2 AM |
| 4,434,326 | 2/1984 | Koeck et al. | 179/2 DP |
| 4,444,999 | 4/1984 | Sparrevohr | 179/2 C |
| 4,549,044 | 10/1985 | Durham | 179/5 R |
| 4,551,582 | 11/1985 | Matsuo | 179/81 R |

Primary Examiner—Keith E. George
Attorney, Agent, or Firm—Limbach, Limbach & Sutton

[57] ABSTRACT

A telephone interrupter for use in a telephone system having low priority and high priority telephone equipment sharing a common telephone line. The low priority equipment is connected to the line by way of a bilateral switch. Sensing circuitry is provided for sensing when the high priority telephone equipment is in use and for causing the bilateral switch to automatically disconnect the low priority equipment from the line. When the sensing circuitry detects that the high priority equipment is no longer using the telephone line, the low priority equipment is automatically reconnected to the line.

24 Claims, 2 Drawing Figures 4,640,988

TELEPHONE INTERRUPTER

TECHNIICAL FIELD

The subject invention relates generally to the field of telephone systems and more particularly to telephone interrupter circuits which cause equipment, such as a computer, to be disconnected from a telephone line when telephones coupled to the line are in use.

BACKGROUND ART

It has become common to use telephone lines for purposes other than providing communications utilizing conventional telephones. For example, telephone lines are used to provide communication between computers. In many applications, non-telephone and telephone equipment share the same telephone line. For example, security devices, such as burglar alarms, frequently share a common telephone line with telephones in the area protected by the alarms.

It is generally not possible for telephone and non-telephone equipment to operate simultaneously on the same telephone line. For example, should an automatic burglar alarm seize the telephone line, telephones on the same line cannot be used. In many instances, it is not possible for persons wishing to make a telephone call to readily disconnect the non-telephone equipment, especially automated equipment, from a telephone line. This is highly undesirable, paricularly in emergency situations when a critical telephone call must be made.

The present invention alleviates the above-noted problem. The subject telephone interrupter causes equipment sharing a common telephone line to be automatically disconnected from the line when a telephone is to be used. The user may select which equipment is to be automatically disconnected, including other telephones. The subject interrupter may be manufactured at low cost and easily installed. These and other advantages of the subject invention will become apparent to those skilled in the art upon reading the following Best Mode for Carrying Out the Invention together with the drawings.

DISCLOSURE OF THE INVENTION

A telephone interrupter for use in a telephone system having low priority and high priority telephone equipment sharing a common telephone line is disclosed. High priority equipment may typically include a telephone and low priority equipment may typically include a computer coupled to the line via a modem.

The subject interrupter includes sensing circuitry for sensing when the high priority telephone equipment has commenced utilizing the telephone line. The sensing circuitry preferably comprises means for detecting current flow in the lines which results when the high priority equipment is in use. The interrupter further includes a switching circuit connected between the telephone line and the low priority telephone equipment. The switching circuit, which is preferably optically-coupled to the sensing circuitry, automatically disconnects the low priority equipment from the telephone line when the high priority equipment is being used. Once the sensing circuitry determines that the high priority equipment is no longer utilizing the line, the switching circuit reconnects the low priority equipment to the line.

BEST MODE FOR CARRYING OUT THE INVENTION

Figure 1:
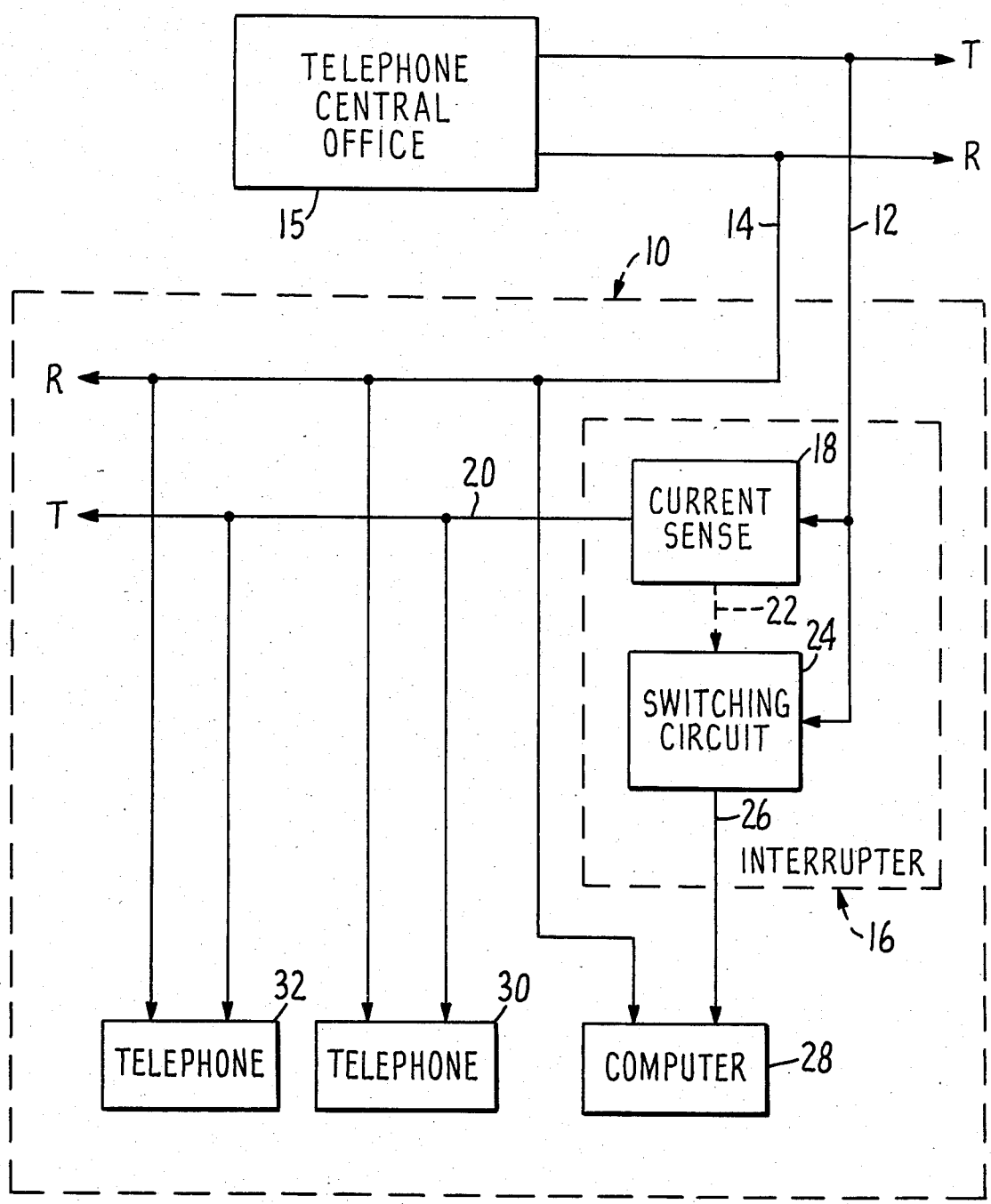
FIG. 1 is a simplified block diagram of an exemplary telephone system utilizing the subject telephone interrupter.

Referring now to FIG. 1 of the drawings, an exemplary telephone installation is shown, generally designated by the numeral 10, utilizing the subject invention. The installation is serviced by a single telephone line, including Tip side 12 and Ring side 14. The line is connected to the main telephone line, which is in turn coupled to a telephone control office, represented by block 15.

The subject telephone interrupter, designated generally by the numeral 16, is connected in series with the Tip side 12 of the line, although the interrupter could also be connected in series with the Ring side 14. Interrupter 16 includes a current sense circuit 18 which is connected to Tip side 12. The output of current sense circuit is connected to a line 20 which serves as the Tip side of the telephone line within installation 10.

Current sense circuit 18 provides a control signal, as represented by line 22, to a switching circuit 24. The input of switching circuit 24 is connected to Tip side 12 of the telephone line. The output of circuit 24 is connected to line 26 which serves as the Tip side of the telephone equipment which may be interrupted. In this particular case, the equipment comprises a computer 28, although the subject interrupter may be utilized with other types of equipment which utilize telephone lines. The Ring side of the computer 28 telephone input is connected directly to Ring side 14 of the telephone line.

All telephone equipment having priority over computer 28 is connected downstream of interrupter 16. In the exemplary embodiment depicted, such higher priority equipment includes conventional telephones 30 and 32.

Before a more detailed description of the subject invention is given, operation of the interrupter will be described. Current sense circuit 18 monitors current flow in the Tip side of the telephone line between line 12 and line 20. So long as telephones 30 and 32 remain in an on-hook condition, or are not on hold, there will be no current between lines 14 and 20. Accordingly, current sense circuit will sense no current flow and will cause switch circuit 24 to connect Tip side lines 12 and 26 together. Thus, computer 28 will be connected to the telephone line and will be capable of transmitting and receiving information over the telephone line.

In the event either telephone 30 or 32 becomes in use, current flow will commence between lines 12 and 20. Current sense circuit 18 will detect the current flow and will cause switch circuit 24 to immediately disconnect computer 28 from the Tip side of the telephone line. Telephones 30 and 32 will then be capable of operating on the single telephone line without interference from computer 28. When operation of telephones 30 and 32 ceases, current sense circuit will detect the absence of current flow and will cause computer 28 be reconnected to the telephone line.

Figure 2:
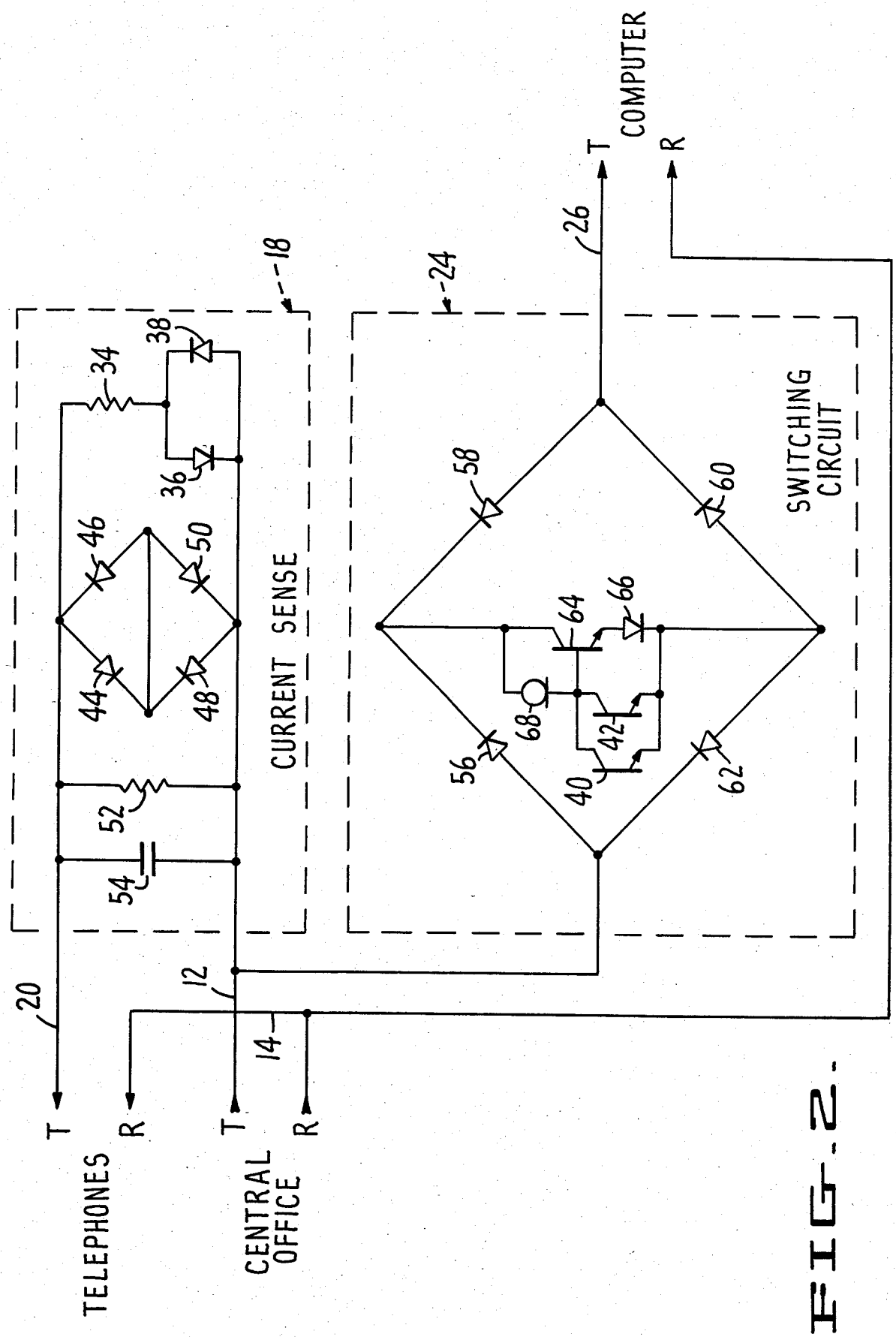
FIG. 2 is a detailed schematic diagram of a preferred embodiment of the subject telephone interrupter.

Referring now to FIG. 2, the current sense circuit 18 is connected in series with the Tip side of the telephone line between lines 12 and 20, as previously noted. Current sense circuit 18 is implemented to sense current flow in both directions so that current flow will be sensed independent of the manner in which Tip side 12 and Ring side 14 are connected to the main telephone line.

Current sense circuit 18 includes a seriesconnected current limit resister 34 having one terminal connected to line 20 and typically has a resistance on the order of 50 ohms. The remaining terminal is connected to the anode and cathode of light-emitting diodes [L.E.D.'s] 36 and 38, respectively. The cathode and anode of dioides 36 and 38, respectively, are connected to line 12.

Diode 36 is optically coupled to a photo-transistor 40 located in switching circuit 24. Similarly, diode 38 is optically coupled to a second photo-transistor 42 located in circuit 24. Preferably, diode 36 and transistor 40 comprises a single conventional optical isolation circuit as do diode 38 and transistor 42.

Current sense circuit 18 also includes a diode bridge comprised of diodes 44, 46, 48 and 50. The anodes of diodes 44 and 48 are connected to lines 20 and 12, respectively, with the cathodes of diodes 46 and 50 being connected to lines 20 and 12, respectively. The anodes of diodes 46 and 50 and the cathodes of diodes 44 and 48 are connected together. Circuit 18 is also provided with by-pass resistor 52 and by-pass capacitor 54 which are parallel-connected between lines 12 and 20.

Switching circuit 24 is connected between line 12, which is coupled to the Tip side of the input telephone line, and line 26, which is the Tip side of the telephone line input to the computer. Circuit 24, which is implemented to conduct in either direction, includes a diode bridge comprised of diodes 56, 58, 60 and 62. The anode and cathode of diodes 56 and 62, respectively, are connected to line 12, and the anode and cathode of diodes 58 and 60, respectively, are connected to line 26. The cathodes of diodes 56 and 58 are connected together as are the anodes of diodes 60 and 62.

Switching circuit 24 further includes an N.P.N. transistor 64 having its collector connected to the juncture of diodes 56 and 58. The emitter of transistor 64 is coupled to the connection between diodes 60 and 62 through a diode 66. A constant current source 68 is connected between the collector and base of transistor 64. A solid state current source such as manufactured by the Siliconix Company of California under the designation CRR0360 has been found suitable for this purpose. Finally, the collectors of photo-transistors 40 and 42 are connected to the base of transistors 64 and the emitters are connected to the juncture of diodes 60 and 62.

Operation of the subject interrupter circuit will now be given. When telephones 30 and 32 (FIG. 1) are not in use, there will be no current flow through current sense circuit 18. Accordingly, neither diode 36 nor diode 38 will be activated. In the event a ringing signal is present on the input lines, resistor 52 and capacitor 54 will provide a by-pass path. Capacitor 54 has a capacitance of approximately 470 microfarads and resistor 52 has a resistance of approximately 5.1 Kohms to provide an effective by-pass for ringing signals, such signals typically having a frequency of 20 Hz.

When neither diode 36 or 38 is activated, phototransistors 40 and 42 are both non-conductive. In that event, substantially all of the current provided by constant current source 68 will flow into the base of transistor 64, causing the transistor to be turned on. Thus, a current path between the juncture of diodes 56 and 58 and the juncture of diodes 60 and 62 is created. If the voltage on line 12 of the Tip side is positive with respect to the Ring side on line 14, current will flow through a current path in switching circuit 24 defined by diode 56, transistor 64, diode 66 and diode 60. If the polarity is reversed, current will flow through circuit 24 via a path defined by diode 58, transistor 64, diode 66 and diode 62. Thus, computer 28 is effectively coupled to the telephone line.

Should either telephone 30 or 32 be lifted off-hook, current will commence to flow through resistor 34 of current sense circuit 18. Depending upon the polarity of the current flow, either L.E.D. 36 or L.E.D. 38 will be activated. The diode bridge formed by diodes 44, 46, 48 and 50 will limit the magnitude of the voltage between lines 20 and 12 to two diode voltage drops or approximately 1.2 volts, regardless of the polarity of the input. Thus, current flow through L.E.D.'s 36 and 38 will be limited to approximately 3 miliamperes (0.6 volts/50 ohms).

Activation of either diode 36 or 38 will cause the associated photo-transistor 40 or 42 to conduct. Conduction of either transistor 40 or 42 will cause the base-to-emitter voltage across transistor 64 to drop thereby causing transistor 64 to shut off. Diode 66 facilitates the turn off of the transistor. With transistor 64 turned off, the A.C. impedance across switching circuit 24 becomes very high so that computer 28 (FIG. 1) is effectively disconnected from the telephone line. Telephones 30 and 32 are then free to use the telephone line without conflict with computer 28. The series impedance of current sense circuit 18 is sufficiently low so as not to interfere with telephone operation.

Constant current source 68 is preferable to a conventional biasing resistor since the current source has a very high A.C. impedance. An ordinary resistor, having an impedance suitable for biasing transistor 64, would tend to provide an undesirable conduction path around transistor 64.

As soon as telephones 30 and 32 are placed on-hook, and are not on-hold, current flow through sense circuit 18 will cease and transistor 64 will be turned back on. Accordingly, computer 28 will be reconnected to the telephone line.

The subject telephone interrupter may also be implemented to be unidirectional rather than bidirectional. In that event, care should be taken to install the circuit, observing the proper polarity. The interrupter is modified by deleting light-emitting diode 36 of the current sense circuit and the associated photo-transistor 40 of the switching circuit. In addition, diodes 56, 58, 60 and 62 of the switching circuit are deleted, with the collector terminal of transistor 64 being connected directly to line 12 and the cathode of diode 66 being connected directly to line 26.

Thus, a novel telephone interrupter has been disclosed. Although a preferred embodiment of the interrupter has been described in some detail, it is to be understood that various changes could be made by persons skilled in the art which would fall within the spirit and scope of the subject invention as defined by the appended claims.

What is claimed is:

1. A telephone interrupter for use in a telephone system coupled to a first end of a telephone line, with a second end of the line coupled to a central office, with the system including first telephone apparatus connected to the line and second telephone apparatus, said interrupter comprising:

detecting means for coupling to the line and for detecting when the first telephone apparatus is utilizing the line by sensing current flow on the line through the first telephone apparatus in two directions, independent of any telephone line impedance intermediate the telephone system and the central office, said detecting means including by-pass means for rejecting current flow on the line caused by ringing signals; and switching means for coupling and decoupling the second telephone apparatus to and from the line in response to said detecting means such that said second telephone apparatus is decoupled from the telephone line whenever said first telephone apparatus is utilizing the line, with said switching means being capable of conducting current in two directions when the second telephone apparatus is coupled to the telephone line and said detecting means and said switching means being optically coupled.

2. The interrupter of claim 1 wherein said switching means includes first, second, third and fourth diodes and an electronic switch which form first and second conduction paths for opposite polarity current flow between the telephone line and the second telephone apparatus, with said first path being defined by said first diode, said electronic switch and said third diode and with said second path being defined by said second diode, said electronic switch and said fourth diode.

3. The interrupter of claim 2 wherein said electronic switch includes a first transistor.

4. The interrupter of claim 3 wherein said detecting means includes first and second light-emitting diodes and said switching means includes a first phototransistor optically-coupled to said first light-emitting diode and a second photo-transistor optically coupled to said second photo-transistors controlling the conduction state of said first transistor.

5. The interrupter of claim 4 wherein said switching means includes a constant current source for providing drive current for said first transistor.

6. A telephone interrupter for use in a telephone system coupled to a first end of a telephone line, with a second end of the line coupled to a central office, with the system including first telephone apparatus connected to the line and second telephone apparatus, said interrupter comprising:

detecting means for coupling to the line and for detecting when the first telephone apparatus is utilizing the line by sensing current flow on the line through the first telephone apparatus independent of any telephone line impedance intermediate the telephone system and the central office, with said detecting means including by-pass means for rejecting current flow on the line caused by ringing signals; and switching means for coupling and decoupling the second telephone apparatus to and from the line in response to said detecting means such that said second telephone apparatus is decoupled from the telephone line whenever said first telephone apparatus is utilizing the line, with said detecting means and said switching means being optically coupled.

7. The interrupter of claim 6 wherein said switching means includes first, second, third and fourth diodes and an electronic switch which form first and second conduction paths for opposite polarity current flow between the telephone line and the second telephone apparatus, with said first path being defined by said first diode, said electronic switch and said third diode and with said second path being defined by said second diode, said electronic switch and said fourth diode.

8. The interrupter of claim 7 wherein said electronic switch includes a first transistor.

9. The interrupter of claim 8 wherein said detecting means includes first and second light-emitting diodes and said switching means includes a first photo-transistor optically-coupled to said first light-emitting diode and a second photo-transistor optically coupled to said second light-emitting diode, with said first and second photo-transistors controlling the conduction state of said first transistor.

10. The interrupter of claim 9 wherein said switching means includes a constant current source for providing drive current for said first transistor.

11. The interrupter of claim 10 wherein said current sensing means is capable of sensing current flow in two directions.

12. A telephone interrupter for use in a telephone system coupled to a first end of a telephone line, with a second end of the line coupled to a central office with the system including first telephone apparatus connected to the line and second telephone apparatus, said interrupter comprising:

current sensing means for sensing current flow through the telephone line drawn by the first telephone apparatus independent of any telephone line impedance intermediate the telephone system and the central office, said sensing means including an optical transmitter which includes a light-emitting diode and ringing signal by-pass means for rejecting ringing signals on the telephone line; and switching means for coupling and decoupling the second telephone apparatus to and from the telephone line such that said second telephone apparatus is decoupled from the line whenever said first telephone apparatus is utilizing the line, said switching means including an optical receiver which includes a photo-transistor and which is optically-coupled to said optical transmitter and an electronic switch which is controlled by said optical receiver.

13. A telephone interrupter for use in a telephone system which includes a telephone line, first telephone apparatus connected to the line and second telephone apparatus, said interrupter comprising:

detecting means for coupling to the line and for detecting when the first telephone apparatus is utilizing the line by sensing current flow through the line in two directions, said detecting means including by-pass means for rejecting current flow on the line caused by ringing signals;

switching means for coupling and decoupling the second telephone apparatus to and from the line in response to said detecting means, with said switching means being capable of conducting current in two directions when the second telephone apparatus is coupled to the telephone line; and optical coupling means for optically coupling said detecting means and said switching means.

14. The interrupter of claim 13 wherein said switching means includes first, second, third and fourth diodes and an electronic switch which form first and second conduction paths for opposite polarity current flow between the telephone line and the second telephone apparatus, with said first path being defined by said first diode, said electronic switch and said third diode and with said second path being defined by said second diode, said electronic switch and said fourth diode.

15. The interrupter of claim 14 wherein said electronic switch includes a first transistor.

16. The interrupter of claim 15 wherein said detecting means includes first and second light-emitting diodes and said switching means includes a first photo-transistor optically-coupled to said first light-emitting diode and a second photo-transistor optically coupled to said second light-emitting diode, with said first and second photo-transistors controlling the conduction state of said first transistor.

17. The interrupter of claim 16 wherein said switching means includes a constant current source for providing drive current for said first transistor.

18. A telephone interrupter for use in a telephone system which includes a telephone line, first telephone apparatus connected to the line and second telephone apparatus, said interrupter comprising:
  detecting means for coupling to the line and for detecting when the first telephone apparatus is utilizing the line by sensing current flow through the line, said detecting means further including by-pass means for rejecting current flow on the line caused by ringing signals;
  switching means for coupling and decoupling the second telephone apparatus to and from the line in response to said detecting means; and
  optical coupling means for optically coupling said detecting means and said switching means.

19. The interrupter of claim 18 wherein said switching means includes first, second, third and fourth diodes and an electronic switch which form first and second conduction paths for opposite polarity current flow between the telephone line and the second telephone apparatus, with said first path being defined by said first diode, said electronic switch and said third diode and with said second path being defined by said second diode, said electronic switch and said fourth diode.

20. The interrupter of claim 19 wherein said electronic switch includes a first transistor.

21. The interrupter of claim 20 wherein said detecting means includes first and second light-emitting diodes and said switching means includes a first photo-transistor optically-coupled to said first light-emitting diode and a second photo-transistor optically coupled to said second light-emitting diode, with said first and second photo-transistors controlling the conduction state of said first transistor.

22. The interrupter of claim 21 wherein said switching means includes a constant current source for providing drive current for said first transistor.

23. The interrupter of claim 22 wherein said current sensing means is capable of sensing current flow in two directions.

24. A telephone interrupter for use in a telephone system which includes a telephone line, first telephone apparatus connected to the line and second telephone apparatus, said interrupter comprising:
  detecting means for coupling to the line and for detecting when the first telephone apparatus is utilizing the line by sensing current flow through the line, said detecting means including by-pass means for rejecting current flow on the line caused by ringing signals; and
  switching means for coupling and decoupling the second telephone apparatus to and from the line in response to said detecting means.

* * * * *